United States Patent
Gutalj et al.

(10) Patent No.: US 7,429,710 B2
(45) Date of Patent: Sep. 30, 2008

(54) THREE-POSITION GROUND SWITCH

(75) Inventors: Vladimir Gutalj, Oberentfelden (CH); Andre Doessegger, Oberentfelden (CH); Hugo Hiltbrunner, Vicques (CH)

(73) Assignee: Areva T&D SA, Paris (FR)

( * ) Notice: Subject to any disclaimer, the term of this patent is extended or adjusted under 35 U.S.C. 154(b) by 250 days.

(21) Appl. No.: 10/567,333

(22) PCT Filed: Aug. 6, 2004

(86) PCT No.: PCT/FR2004/050378

§ 371 (c)(1),
(2), (4) Date: Feb. 6, 2006

(87) PCT Pub. No.: WO2005/018066

PCT Pub. Date: Feb. 24, 2005

(65) Prior Publication Data

US 2007/0158311 A1    Jul. 12, 2007

(30) Foreign Application Priority Data

Aug. 7, 2003    (FR) ................................. 03 09740

(51) Int. Cl.
*H01H 33/00* (2006.01)
(52) U.S. Cl. .......................................... 218/79; 218/55
(58) Field of Classification Search ................ 200/400, 200/401, 500, 501, 17 R, 48 R–48 C; 218/2, 218/4, 6, 8, 9, 10, 11, 12, 45, 55, 67, 79, 218/80, 100
See application file for complete search history.

(56) References Cited

U.S. PATENT DOCUMENTS

| | | | | |
|---|---|---|---|---|
| 3,569,641 A | * | 3/1971 | Boersma et al. .......... 200/50.21 |
| 4,255,632 A | * | 3/1981 | Backskog .................... 218/55 |
| 4,413,166 A | * | 11/1983 | Meyer ......................... 218/80 |
| 4,486,634 A | * | 12/1984 | Nakano et al. ............... 218/55 |
| 4,555,603 A | | 11/1985 | Aoyama |
| 4,577,075 A | * | 3/1986 | Akita et al. ................... 218/55 |
| 4,821,140 A | * | 4/1989 | Takeuchi et al. ............ 361/612 |
| 5,410,116 A | * | 4/1995 | Ozawa et al. ................ 218/67 |
| 5,484,972 A | * | 1/1996 | Tecchio ....................... 218/70 |

(Continued)

FOREIGN PATENT DOCUMENTS

DE        42 43 046        6/1994

(Continued)

*Primary Examiner*—Michael A Friedhofer
(74) *Attorney, Agent, or Firm*—Oblon, Spivak, McClelland, Maier & Neustadt, P.C.

(57) ABSTRACT

A high or medium voltage electrical switch, particularly a GIS type isolating switch with three switching positions and a grounding position, includes a switching element in a closed and sealed enclosure that can be filled with a dielectrically insulating gas, containing a mobile switching element free to move along an axial direction to electrically connect two conducting bars at intervals from each other, and also including a fixed ground contact to be electrically connected to one of the two conducting bars through the switching element when the switch is in the grounding position. The fixed ground contact is offset from the path of the switching element along the axial direction and the switching element forms a Y with a contact pin such that the contact pin and the fixed ground contact engage in each other through displacement of the switching element along the axial direction.

22 Claims, 3 Drawing Sheets

U.S. PATENT DOCUMENTS

| | | | | |
|---|---|---|---|---|
| 5,796,060 | A * | 8/1998 | Fuchsle et al. | 218/79 |
| 5,828,025 | A * | 10/1998 | Neumaier et al. | 218/79 |
| 5,872,346 | A * | 2/1999 | Meinherz et al. | 218/2 |
| 6,559,403 | B2 * | 5/2003 | Gutalj | 218/79 |
| 7,122,759 | B2 * | 10/2006 | Moser et al. | 218/79 |

FOREIGN PATENT DOCUMENTS

| | | |
|---|---|---|
| EP | 1 020 970 | 7/2000 |
| GB | 1 329 725 | 9/1973 |

\* cited by examiner

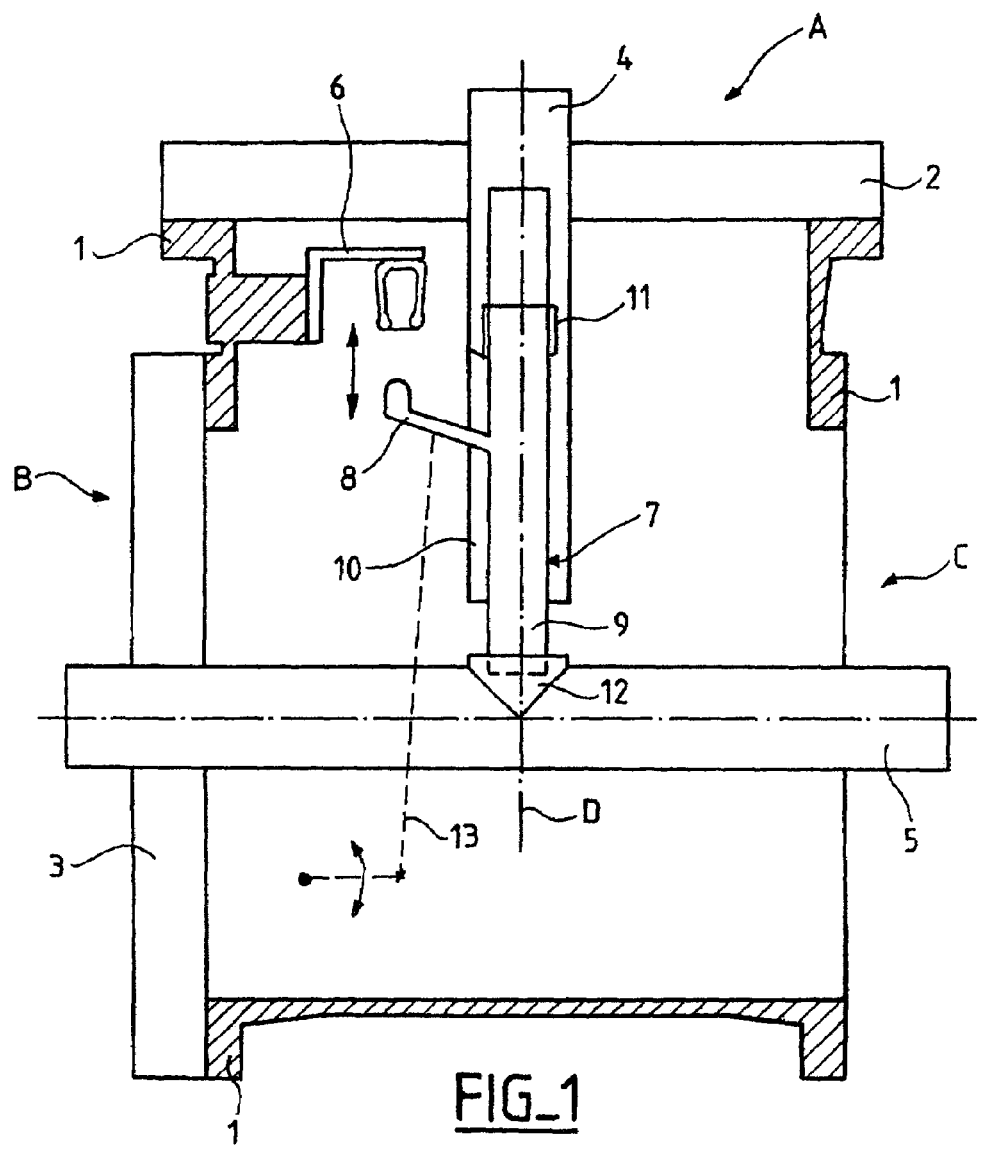
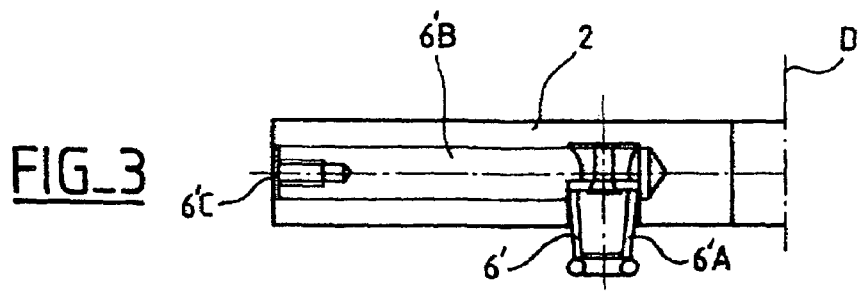

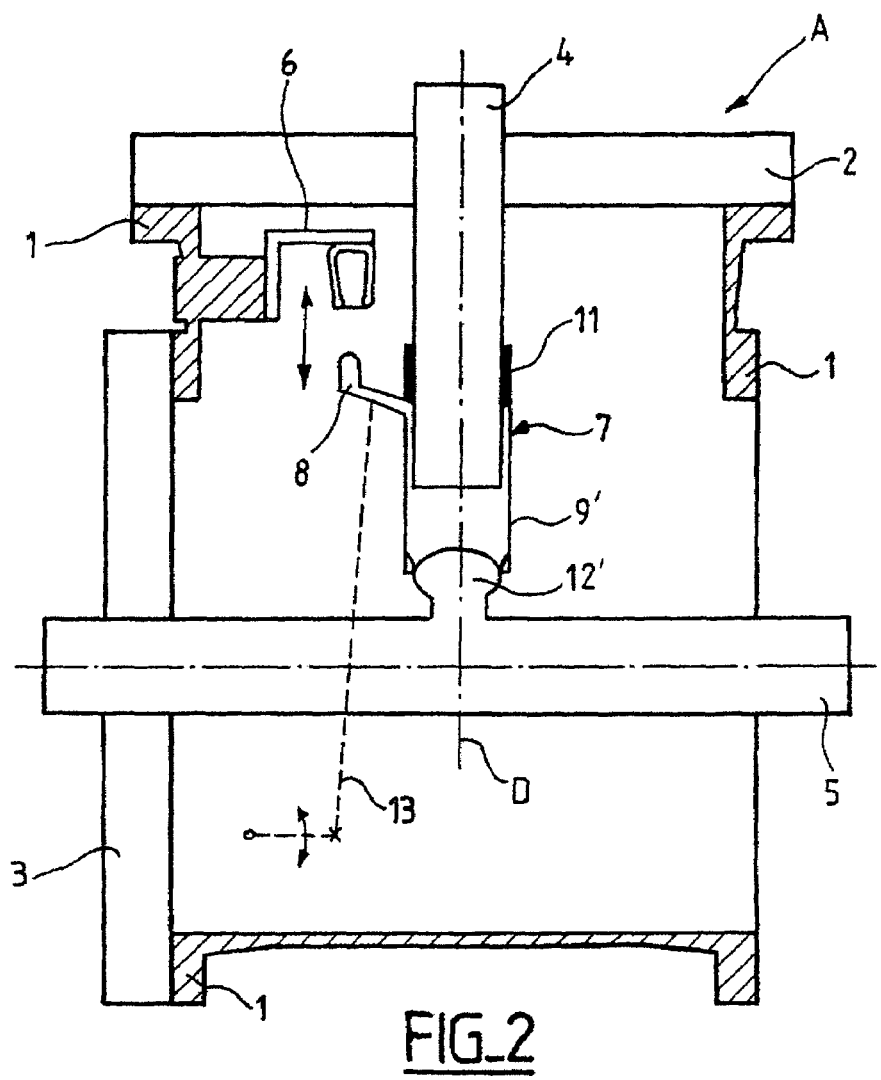
FIG_2
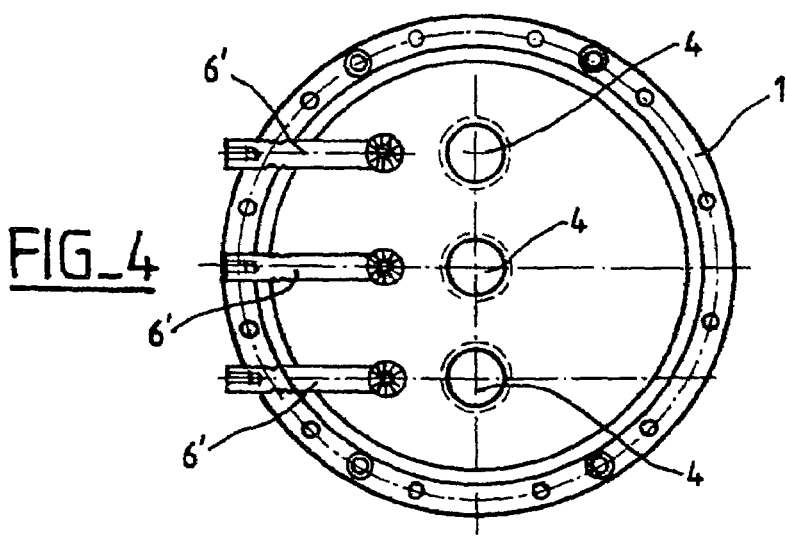
FIG_4

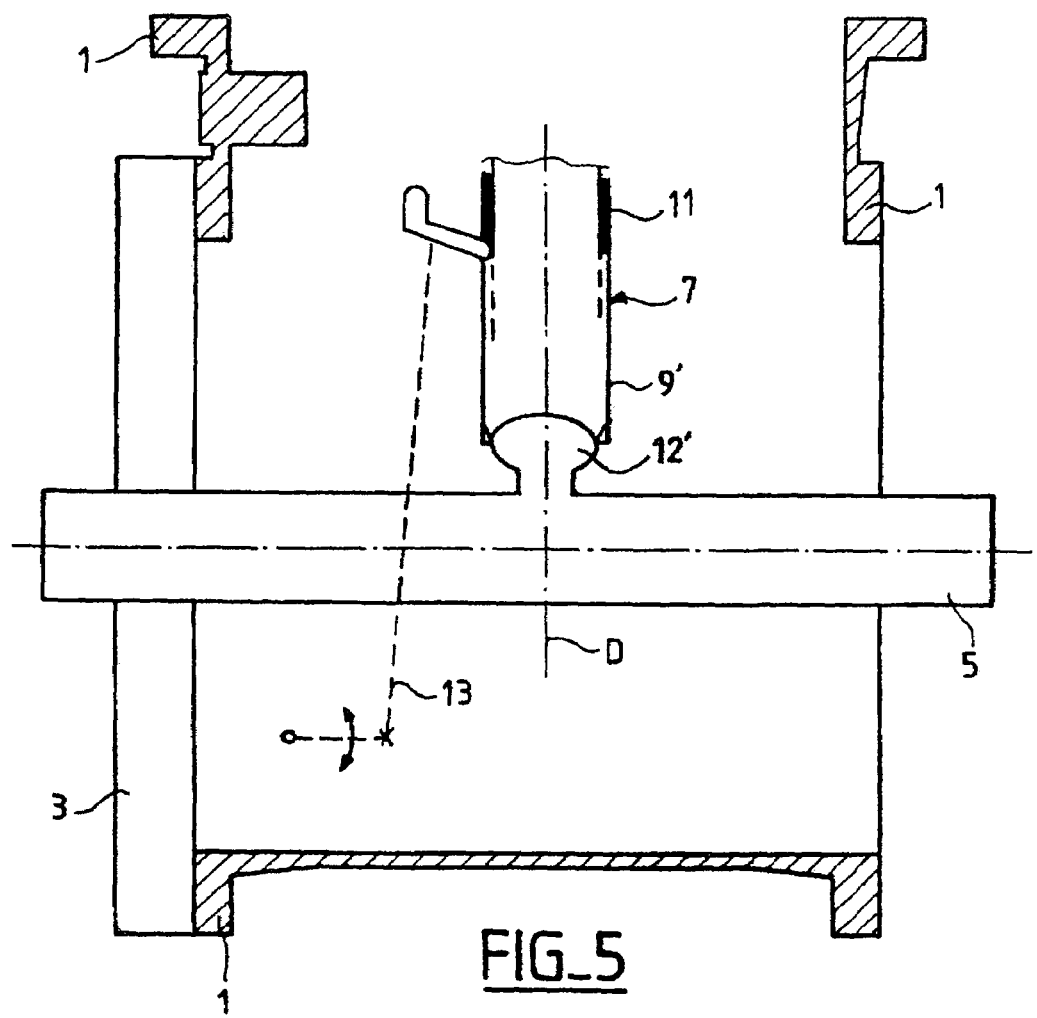
FIG_5

THREE-POSITION GROUND SWITCH

TECHNICAL DOMAIN

The invention relates to a high or medium voltage electrical or isolating switch with three switching positions with an earthing position, comprising a closed and sealed enclosure that can be filled with a dielectrically insulating gas, containing a mobile switching element free to move along an axial direction to electrically connect two conducting bars at intervals from each other and also including a fixed earthing contact that will be electrically connected to one of the two conducting bars through the switching element when the switch is in the earthing position.

Such an SF6 GIS (Gas Insulated Switch) type earthing switch is known, for example as disclosed in EP-1128509. In this isolating switch, two fixed breaking contacts fixed to two conducting bars coaxial with each other and the fixed earthing contact are superposed along the said axial direction. This known arrangement has the disadvantage that it is large, complicated to make and expensive.

EP-824264 discloses a GIS type isolating switch similar to that disclosed in EP-1128509 but in which the fixed breaking contacts are installed on two conducting bars approximately perpendicular to each other. In this known arrangement, the switching element is moved along an axial direction that is oblique to the two conducting bars which introduces complications and increases manufacturing costs.

The GIS gas insulated type isolating switch with three switching positions disclosed in U.S. Pat. No. 5,134,542 includes two switching elements for each phase, one of which will connect two fixed breaking contacts each fixed to one of the two conducting bars, and the other being designed to connect one of the two fixed breaking contacts to the fixed earthing contact. This arrangement also has the disadvantage that it is complicated to make and expensive.

The purpose of the invention is to propose a high and medium voltage electrical switch, particularly a GIS type isolating switch with three switching positions and an earthing position as defined above, that is simpler to make, more economic and not as large particularly for configurations in which the conducting bars are approximately in line with each other or in which the centre-lines are approximately in the same plane and for example are at an angle of 90° from each other.

Thus, the purpose of the invention is an electrical switch like that defined above, characterized in that the fixed earthing contact is offset from the path of the switching element along the said axial direction, in that the switching element forms a Y with a contact pin such that the contact pin and the fixed earthing contact engage in each other through displacement of the switching element along the said axial direction. Furthermore, a first fixed breaking contact of one of the two conducting bars and a second fixed breaking contact of the second conducting bar are positioned on the same axial direction of a sliding axial part of the electrically conducting switching element.

The electrical switch according to the invention may also have the following special features:

the sliding part of the switching element may be composed of a rod that slides along the said axial direction inside one of the two conducting bars, the contact pin with the rod forming a Y;

the rod of the switching element engages in a hollow fixed breaking contact fixed onto the other conducting bar;

the sliding part of the switching element may be composed of a sleeve that slides on one of the two conducting bars along the said axial direction, the contact pin with the sleeve forming a Y;

the sleeve of the switching element engages on a fixed breaking contact in the form of a mushroom fixed on the other conducting bar;

the fixed earthing contact is a hollow contact in the form of electrical contact pins in which the contact pin of the mobile switching element engages;

the fixed earthing contact is a rod and the contact pin of the mobile switching element has a tulip-shaped hollow end into which the fixed earthing contact engages;

a system with a rotating lever and an articulated linkage placed in the enclosure is provided to move the mobile switching element along the said axial direction;

the fixed earthing contact is embedded partly in a support plate made of an insulating material closing the enclosure.

According to the final feature, the plate made of an insulating material may be used as a support for a conducting bar and/or a partition inside the enclosure. This special feature according to which the fixed earthing contact is partly embedded in the support plate is particularly advantageous in terms of compactness of the electrical switch according to the invention, but it can also be used for other applications. In particular, it may be applied to obtain the same advantages for a GIS type switch in which the switching element is rotating. It may also be applicable to other types of electrical switches with an earthing position independently of a particular embodiment of the switching element.

Example embodiments of an electrical switch according to the invention are described below and are illustrated in the figure.

FIG. 1 very diagrammatically shows a GIS type electrical switch with three switching positions according to the invention in which the switching element comprises a rod that slides inside a conducting bar.

FIG. 2 very diagrammatically shows a GIS type electrical switch with three switching positions according to the invention in which the switching element includes a sleeve that slides on a conducting bar.

FIG. 3 shows a fixed earthing contact partly embedded in the support plate closing off the enclosure of the electrical switch with three switching positions according to the invention, in more detail.

FIG. 4 shows a top view of a three-phase arrangement of the fixed earthing contacts embedded in a support plate.

FIG. 5 shows an arrangement of the isolating switch according to the invention in which the support plate in FIG. 4 is taken out of the enclosure.

FIG. 1 very diagrammatically illustrates a cross section through a high or medium voltage electrical switch according to the invention which in this case is a GIS type isolating switch with three switching positions and an earthing position.

FIG. 1 shows enclosure 1 of the isolating switch, a generally cylindrical-shaped metallic enclosure that has openings A, B and C closed off by electrically insulating plates such as 2, 3 acting as supports to electrical conducting bars penetrating into the enclosure 1 through openings A, B and C. The enclosure 1 is hermetically sealed and can be filled with a dielectrically insulating gas such as SF6 at a pressure of a few bars.

As can be seen in FIG. 1, an electrically conducting bar 4, 5 passes through the two support plates 2, 3 respectively, in this case the two conducting bars 4, 5 being installed in the enclosure 1 at a 90° arrangement, in other words perpendicular to each other and with a spacing between them equal to a certain dielectric insulation distance. These two conducting bars 4,5 form one phase of the isolating switch, knowing that the invention is applicable to each phase of a high or medium voltage single-phase or multiphase isolating switch.

In the example illustrated in FIG. 1, the isolating switch may be connected through the conducting bar 5 to a shielded bus bar assembly on the same side of the opening B as the enclosure 1 and through the bar 4 to a shielded circuit breaker on the same side of the opening A as the enclosure 1.

As shown very diagrammatically in FIG. 1, the isolating switch comprises a fixed earthing contact 6 for the phase composed of the conducting bars 4, 5 arranged close to the support plate 2 and that is electrically connected to the earth through the metal enclosure 1. Furthermore, the isolating switch includes a switching element 7 free to move along an axial direction D to connect the two conducting bars 4, 5 when it is in a first switching position or closed position (shown in FIG. 1) and to connect the conducting bar 4 with the fixed earthing contact 7 when it is in an earthing position. The third position of the isolating switch is an open position in which the two conducting bars 4,5 are separated from each other by a certain dielectric insulation distance without earthing of the bar 4.

According to the invention, the fixed earthing contact 6 is installed in the enclosure 1 offset from the path of the switching element along the axial direction D and the switching element 7 forms a Y with an electrically conducting contact pin 8 such that the conducting bar 4 is earthed by displacement of the switching element 7 along the axial direction D, in this case a displacement of the switching element 7 in the upwards direction in FIG. 1 until the fixed earthing contact 6 and the contact pin 8 engage in each other.

In the example illustrated in FIG. 1, the switching element 7 comprises an electrically conducting rod 9 that extends axially along the direction D inside the conducting bar 4. The conducting bar 4 comprises an axial reaming for this purpose along which the rod 9 slides with a longitudinal slit 10 inside which the contact pin 8 slides and forms a Y with the rod 9. In this arrangement, the electrical connection between the conducting bar 4 and the rod 9 of the mobile switching element 7 is made by a first fixed switching contact 11 of the linear sliding contact type fitted with contact strips and arranged in the bottom of the reaming of the conducting bar 4. The electrical connection between the conducting bar 5 and the rod 9 of the mobile switching element 7 is made through a second fixed breaking contact 12 fixed on the bar 5, this second breaking contact in this case being a hollow contact fitted with contact strips inside which the rod 7 is inserted. The two fixed breaking contacts are in-line along the axial direction D.

FIG. 1 shows the fixed earthing contact 6 in the form of a hollow contact in the form of elastic contact pins inside which the rod-shaped contact pin 8 engages. Obviously, the fixed earthing contact 6 could be a rod shaped contact that engages in a hollow tulip shape end of the contact pin 8.

FIG. 1 shows a control system with a rotating lever and an articulated linkage denoted by 13 that is arranged in the enclosure 1 to move the switching element 7 along the direction D.

FIG. 2 shows another example embodiment of the switching element 7 for an isolating switch according to the invention similar to that in FIG. 1 and that in this case comprises an electrically conducting sleeve 9' sliding on the conducting bar 4 and electrically connected to it by a first fixed breaking contact 11 of the linear sliding contact type arranged in the sleeve 9'. The sleeve 9' forms a Y with the contact pin 8. The second fixed breaking contact 12' fixed on the conducting bar 5 is in the form of a mushroom on which the tulip shaped end 9' closes when the isolating switch is in its closed position.

In the same way as in FIG. 1, a system with a rotating lever and an articulated linkage 13 controls displacement of the switching element 7 along the direction D.

The invention is fully applicable to an isolating switch in which the bars of a single phase that might be connected by the switching element of the earthing switch are arranged approximately in line with each other. It is quite possible to modify the devices shown in FIGS. 1 and 2, to obtain functionally identical earthing switches in in-line bus bar architectures. For example starting from the device in FIG. 1, it is possible to significantly shorten the length of the described busbar segment 5 by half, and to rotate this segment and its support plate 3 by 90° to arrange the bar along the line of the bar 4, provided obviously that there is an opening in the enclosure 1 closed off by the support plate 3 facing the opening A. In this case, the second fixed breaking contact 12 should be fixed to the end of the bar 5 facing the first fixed breaking contact 11.

According to one particularly important feature of the invention, the fixed earthing contact may be partly embedded in the support plate 2 as illustrated in FIG. 3 by the fixed earthing contact 6', which contributes to even further reducing the dimensions of the isolating switch. In the example shown in FIG. 3, the fixed earthing contact 6' includes a conducting part 6'A with a hollow contact that passes through the support plate 2 along the axial direction D and is provided with elastic contact pins, for example shaped like a tulip, the contact pin of the mobile switching element being capable of engaging in this hollow part 6'A. The earthing contact 6' also comprises another rod-shaped contact conducting part 6'B that extends in the plane of the support plate 2 and opens up on the outside edge of this support plate to enable connection to the earth through an end connector 6'C. of the rod. For example, this earth connection can be made using a cable fixed at one end in the end connector 6'C. of the rod and fixed at the other end to the enclosure 1 of the switch 2. The two conducting parts 6'A and 6'B of the fixed earthing contact 6' may be separable from each other to enable a simple assembly by engagement in the support plate 2.

FIG. 4 is a top view showing the arrangement of the fixed earthing contacts 6' in FIG. 3 in a three-phase construction of the isolating switch according to the invention. With this arrangement, the enclosure 1 can be opened by removing the support plate 2 together with each fixed earthing contact 6' and each conducting bar 4 as illustrated in FIG. 5.

More particularly, FIG. 5 corresponds to manufacturing of the isolating switch in FIG. 2 but with a fixed earthing contact 6' embedded partly in the thickness of the support plate as illustrated in FIG. 3. Removal of the support plate 2 together with the fixed earthing contact 6' and the conducting bar 4 facilitates maintenance operations of the isolating switch, particularly in that the conducting bar 4 can be earthed after it has been electrically separated from the conducting bar 5. The bar 4 is earthed using a cable or a conducting part, for example connected to the tulip-shaped contact 6'A of the fixed earthing contact 6', which is already earthed through the end connector 6'C. of the rod as mentioned above. Moreover, there is no need to disassemble the control system with rotating lever and articulated linkage 13.

It should be understood that when the support plate 2 together with the fixed earthing contact 6' and the conducting bar 4 are lifted along the direction D, the isolating switch is put into its closed position such that the switching element 7, in this case including the sleeve 9', remains fixed to the second fixed breaking contact 12' and separates from the conducting bar 4.

The invention claimed is:

1. An electrical switch, comprising:
   a first conducting bar with a first axis;
   a second conducting bar with a second axis perpendicular to the first axis of the first conducting bar, and that has an end at a spacing from the first conducting bar;
   a fixed grounding contact to be electrically connected to the first conducting bar;
   a switching element free to move along a first axial direction of the first axis between a grounding position in which the first and second conducting bars are separated from each other and a switching position in which the first and second conducting bars are connected to each other,
   wherein the switching element includes a contact pin parallel to the first axis and located at a distance from the first axis, such that the fixed grounding contact and the contact pin engage in each other through displacement of the switching element along the first axial direction, the grounding and switching positions located on each side of the closed position.

2. An electrical switch according to claim 1, wherein a first fixed breaking contact of one of the two conducting bars and a second fixed breaking contact of the second conducting bar are positioned on the same first axial direction of a sliding axial part of the electrically conducting switching element.

3. An electrical switch according to claim 2, wherein the sliding part of the switching element is a rod that slides along the first axial direction inside one of the two conducting bars, the contact pin with the rod forming a Y.

4. An electrical switch according to claim 3, wherein the rod of the switching element engages in a hollow fixed breaking contact fixed onto the other of the two conducting bars.

5. An electrical switch according to claim 4, wherein the sleeve of the switching element engages on a fixed breaking contact in a form of a mushroom fixed on the other of the two conducting bars.

6. An electrical switch according to claim 5, wherein the fixed grounding contact comprises a conducting part with a hollow contact provided with elastic contact pins and into which the contact pin of the mobile switching element engages.

7. An electrical switch according to claim 5, wherein the fixed grounding contact is a rod and the contact pin of the mobile switching element has a tulip-shaped hollow end into which the fixed grounding contact engages.

8. An electrical switch according to claim 5, wherein the fixed grounding contact is embedded partly in a support plate made of an insulating material closing an enclosure of said electrical switch.

9. An electrical switch according to claim 4, wherein the fixed grounding contact comprises a conducting part with a hollow contact provided with elastic contact pins and into which the contact pin of the mobile switching element engages.

10. An electrical switch according to claim 4, wherein the fixed grounding contact is a rod and the contact pin of the mobile switching element has a tulip-shaped hollow end into which the fixed grounding contact engages.

11. An electrical switch according to claim 4, wherein the fixed grounding contact is embedded partly in a support plate made of an insulating material closing an enclosure of said electrical switch.

12. An electrical switch according to claim 3, wherein the fixed grounding contact comprises a conducting part with a hollow contact provided with elastic contact pins and into which the contact pin of the mobile switching element engages.

13. An electrical switch according to claim 3, wherein the fixed grounding contact is a rod and the contact pin of the mobile switching element has a tulip-shaped hollow end into which the fixed grounding contact engages.

14. An electrical switch according to claim 3, wherein the fixed grounding contact is embedded partly in a support plate made of an insulating material closing an enclosure of said electrical switch.

15. An electrical switch according to claim 2, wherein the sliding part of the switching element is a sleeve that slides on one of the two conducting bars along the first axial direction, the contact pin with the sleeve forming a Y.

16. An electrical switch according to claim 2, wherein the fixed grounding contact comprises a conducting part with a hollow contact provided with elastic contact pins and into which the contact pin of the mobile switching element engages.

17. An electrical switch according to claim 2, wherein the fixed grounding contact is a rod and the contact pin of the mobile switching element has a tulip-shaped hollow end into which the fixed grounding contact engages.

18. An electrical switch according to claim 2, wherein the fixed grounding contact is embedded partly in a support plate made of an insulating material closing an enclosure of said electrical switch.

19. An electrical switch according to claim 1, wherein the sliding part of the switching element is a sleeve that slides on one of the two conducting bars along the first axial direction, the contact pin with the sleeve forming a Y.

20. An electrical switch according to claim 1, wherein the fixed grounding contact comprises a conducting part with a hollow contact provided with elastic contact pins and into which the contact pin of the mobile switching element engages.

21. An electrical switch according to claim 1, wherein the fixed grounding contact is a rod and the contact pin of the mobile switching element has a tulip-shaped hollow end into which the fixed grounding contact engages.

22. An electrical switch according to claim 1, wherein the fixed grounding contact is embedded partly in a support plate made of an insulating material closing an enclosure of said electrical switch.

* * * * *